(12) United States Patent
Sjogren et al.

(10) Patent No.: US 7,590,314 B1
(45) Date of Patent: Sep. 15, 2009

(54) FIBER OPTIC SENSOR FOR TOW WRAP

(75) Inventors: John F. Sjogren, Wichita, KS (US); Michael R. Grosser, Derby, KS (US)

(73) Assignee: Spirit Aerosystems, Inc., Wichita, KS (US)

( * ) Notice: Subject to any disclaimer, the term of this patent is extended or adjusted under 35 U.S.C. 154(b) by 0 days.

(21) Appl. No.: 12/204,396

(22) Filed: Sep. 4, 2008

(51) Int. Cl.
*G02B 6/00* (2006.01)
(52) U.S. Cl. .......................................... 385/13; 385/12
(58) Field of Classification Search .................... 385/13
See application file for complete search history.

(56) References Cited

U.S. PATENT DOCUMENTS

| | | | | |
|---|---|---|---|---|
| 5,726,750 | A * | 3/1998 | Ito et al. | 356/244 |
| 5,767,963 | A * | 6/1998 | Berger | 356/238.2 |
| 5,774,227 | A * | 6/1998 | Oei | 356/430 |
| 6,491,773 | B1 * | 12/2002 | Miller et al. | 156/64 |
| 6,975,338 | B2 * | 12/2005 | Hirai et al. | 347/133 |
| 7,113,272 | B2 * | 9/2006 | Bourely et al. | 356/237.1 |
| 7,200,521 | B2 * | 4/2007 | Strebe | 702/182 |
| 2004/0251435 | A1 * | 12/2004 | Sawayama et al. | 250/559.16 |

* cited by examiner

*Primary Examiner*—Frank G Font
*Assistant Examiner*—Eric Wong
(74) *Attorney, Agent, or Firm*—Hovey Williams LLP

(57) ABSTRACT

A system and method for detecting unwanted wrapping of one or more of a plurality of strips of material around a feed roller intended to urge the strips of material forward. During proper operation, the strips of material remain to a first side of the feed roller, but an error may cause the material to pass to a second side of the feed roller. The system for detecting this error may comprise a plurality of send optical fibers configured to send light in a direction toward the second side of the feed roller; a plurality of receive optical fibers configured to receive light reflected off of the feed roller and/or any of the strips of material; and an alarm for notifying a user or an automated system if an amount of light received is not a desired amount of light, indicating reflection off of at least one strip of material.

17 Claims, 6 Drawing Sheets

FIBER OPTIC SENSOR FOR TOW WRAP

BACKGROUND

1. Field

The present invention relates to a system and method for detecting unwanted wrapping of a strip of material around at least one feed roller. Specifically, the present invention relates to a fiber optic sensor for detecting if any of a plurality of strips of composite fiber tow are beginning to wrap around a feed roller within a composite fiber tow placement machine.

2. Related Art

Composite fiber tow or tape is used in the manufacture of composite parts, such as various aircraft components. Composite fiber tow may be an elongated strip of composite material, and a plurality of strips of composite fiber tow may be fed through a composite fiber tow placement machine having at least one compaction head or compaction roller configured for compacting the composite fiber tow onto a surface of a desired size and shape to form the composite part. However, in various tow placement machines, an error or malfunction called "tow wrap" may occasionally occur, in which one of the strips of composite fiber tow gets caught in a feed roller inside of the tow placement machine, and begins to wrap around the feed roller. Since the purpose of the feed roller is to urge the composite fiber tow forward, "tow wrap" creates an undesirable situation in which the tow is not urged forward and may even become jammed within the tow placement machine as the composite fiber tow attempts to wrap around the feed roller.

Typically, a "tow wrap" may go undetected until an operator visually notices that one or more of the strips of composite fiber tow have not exited the tow placement machine, or until the tow placement machine becomes jammed. If the tow placement machine becomes jammed due to "tow wrap", internal damage may occur within the tow placement machine. Additionally, it can be difficult to remove the composite fiber tow from the feed roller when it becomes jammed. Therefore "tow wrap" may cause undesired repair costs and downtime.

Accordingly, there is a need for a method of detecting "tow wrap" within composite fiber tow placement machines that overcomes the limitations of the prior art.

SUMMARY

The present invention provides a system and method for detecting unwanted wrapping of strips of material around at least one feed roller. The strips of material may be composite fiber tow, composite fiber tape, or any material known in the art. Specifically, the system may provide one or more fiber optic sensors for detecting tow wrap. Tow wrap may be defined as unwanted wrapping of any of a plurality of strips of material around a feed roller, particularly within a composite fiber tow placement machine.

The system may comprise at least one fiber optic sensor, which may comprise at least one send fiber optic cable for sending pulses of light, at least one receive fiber optic cable for receiving pulses of light, at least one amplifier for sending pulses of light to and receiving pluses of light from the fiber optic cables, and a housing. The send fiber optic cable may comprise a plurality of send optical fibers directed toward the feed roller, and the receive fiber optic cable may comprise a plurality of receive optical fibers directed toward the feed roller.

Each strip of material may be fed by the feed roller along one of a plurality of lanes, which may be spaced apart by a distance approximately equal to the width of one of the strips of material. There may be at least one send optical fiber and at least one receive optical fiber per lane. The housing may encase a portion of the optical fibers such that an end portion of each optical fiber may be directed toward the feed roller relative to one of the lanes.

In normal or desired operation, the strips of material may not intersect the light shining from the end portions of the send optical fibers. Therefore, the amount of light from the send optical fibers reflected off of the feed roller into the receive optical fibers, as measured by the amplifier when no tow wrap is occurring, may be a desired amount of light.

However, if one or more of the strips of material begin to wrap around the feed roller, the light from one or more of the send optical fibers may shine onto one or more of the strips of material, which may cause a different amount of light to be reflected and received by the receive optical fibers. Therefore, if this occurs, the amplifier may sense an amount of light that does not correspond with the desired amount of light, and may therefore alert a user or an automated system.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
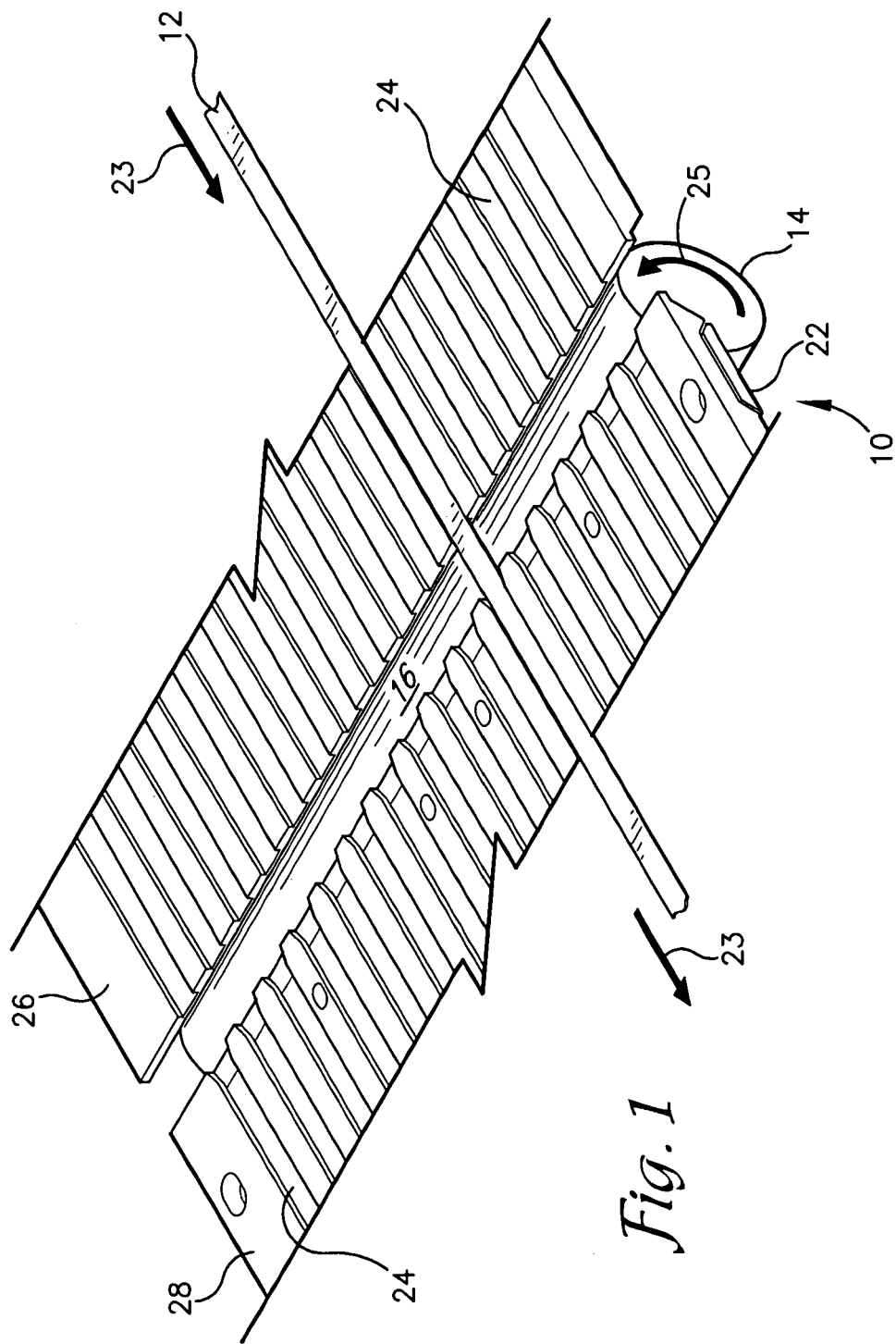
FIG. 1 is a perspective view of a system constructed in accordance with an embodiment of the present invention and mounted proximate a feed roller for detecting unwanted wrapping of strips of material around the feed roller.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
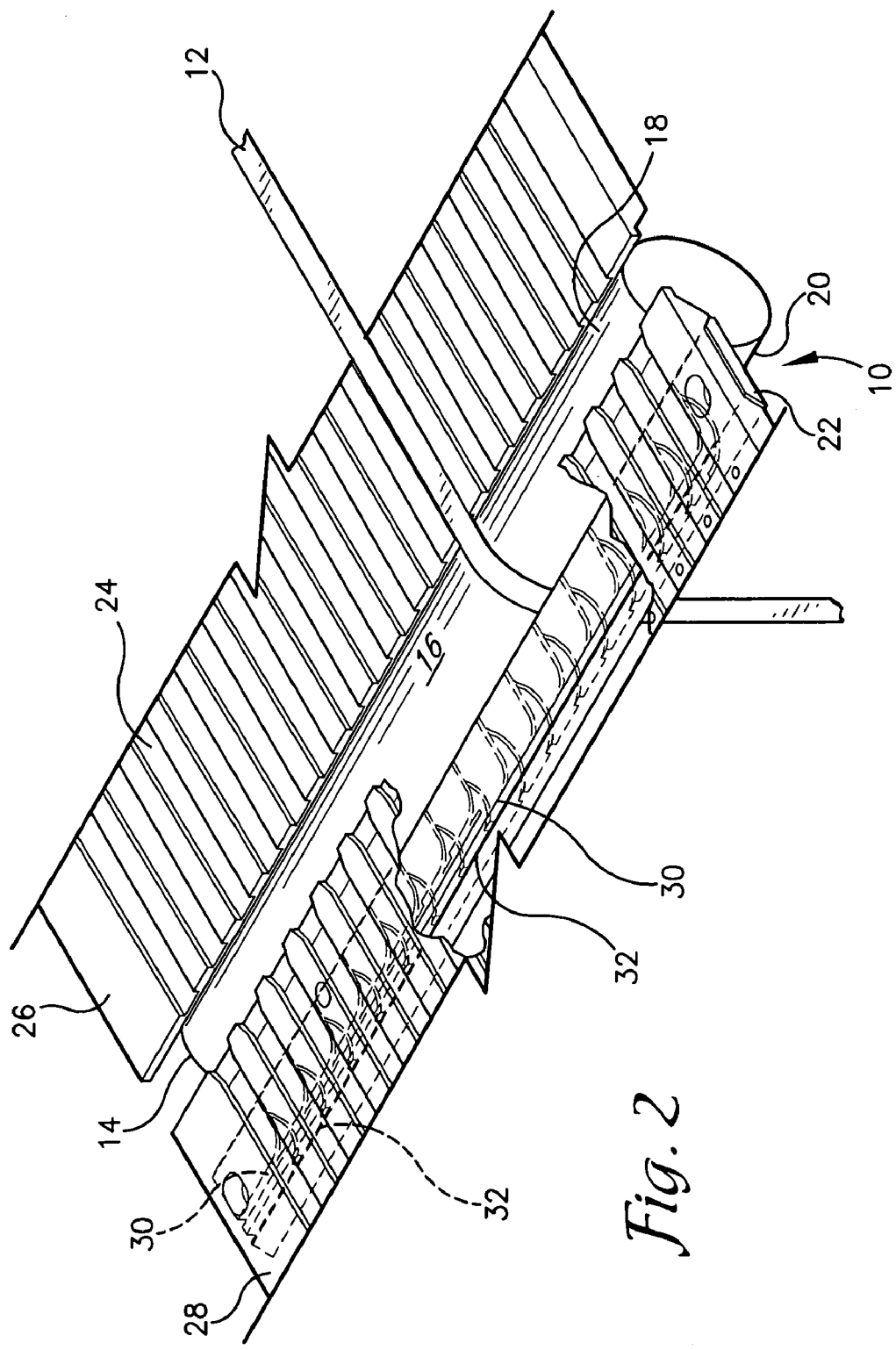
FIG. 2 is a cross-sectional view of the system of FIG. 1.

As illustrated in FIGS. 1 and 2, the present invention provides a system 10 and method for detecting unwanted wrapping of strips of material 12 around at least one feed roller 14. The strips of material 12 may be composite fiber tow, composite fiber tape, or any material known in the art. Specifically, the system 10 may alert a user or an automated system of an occurrence of tow wrap. Tow wrap may be defined as unwanted wrapping of any of a plurality of strips of material 12 around the feed roller 14, particularly within a composite fiber tow placement head (not shown).

For example, in various apparatuses for feeding the strips of material 12 in a particular direction, the strips of material 12 may contact an outer surface 16 of the feed roller 14 and may be configured to remain to a first side 18 of the feed roller during proper operation. However, during a malfunction, such as tow wrap, at least some of the strips of material 12 may be wrapped around to a second side 20 of the feed roller 14. So, in proper operation of the feed roller, the strips of material 12 may contact the outer surface 16 of the feed roller 14 such that each of the strips of material 12 may form a substantially tangential line relative to a circumference of the feed roller 14. This contact, through friction or other sticking forces, may cause the strips of material 12 to be fed tangentially forward in a direction 23 corresponding to the rotation 25 of the feed roller 14. However, if the friction of sticking force between the feed roller 14 and any of the strips of material 12 becomes too great, or some other malfunction prevents at least one of the strips of material 12 from moving tangentially forward relative to the feed roller 14, at least one of the strips of material 12 may begin to wrap around the feed roller 14, thereby creating the undesired tow wrap discussed above.

The system for detecting tow wrap may comprise one or more fiber optic sensors 22, as described herein. For example, in various embodiments of the invention, the system may comprise two fiber optic sensors 22 to monitor the occurrence of tow wrap for a plurality of lanes 24 within a composite fiber tow placement head, such as a placement head having thirty-two lanes, each directing a strip of composite fiber tow 12. In this example, sixteen top lanes may be monitored by one of the fiber optic sensors, and sixteen bottom lanes may be monitored by the other of the fiber optic sensors.

In various embodiments of the invention, the at least one fiber optic sensor 22 may be used within the composite fiber tow placement head of a composite fiber tow placement machine. In the composite fiber tow placement head, the plurality of strips of material 12 may be urged forward by the feed roller 14 and directed along the plurality of lanes 24 to a compaction head or compaction roller (not shown) for compacting the strips of material 12 onto a surface (not shown) for forming a composite part. The lanes 24 within the tow placement head may be slots formed within guide plates 26, 28, as illustrated in FIGS. 1 and 2, or the strips of material 12 may be maintained in substantially parallel lanes in relation to each other by other means known in the art. The guide plates 26, 28 may comprise a rearward guide plate 26 disposed rearward of the feed roller 14 and a forward guide plate 28, disposed immediately forward of the feed roller 14.

Figure 3:
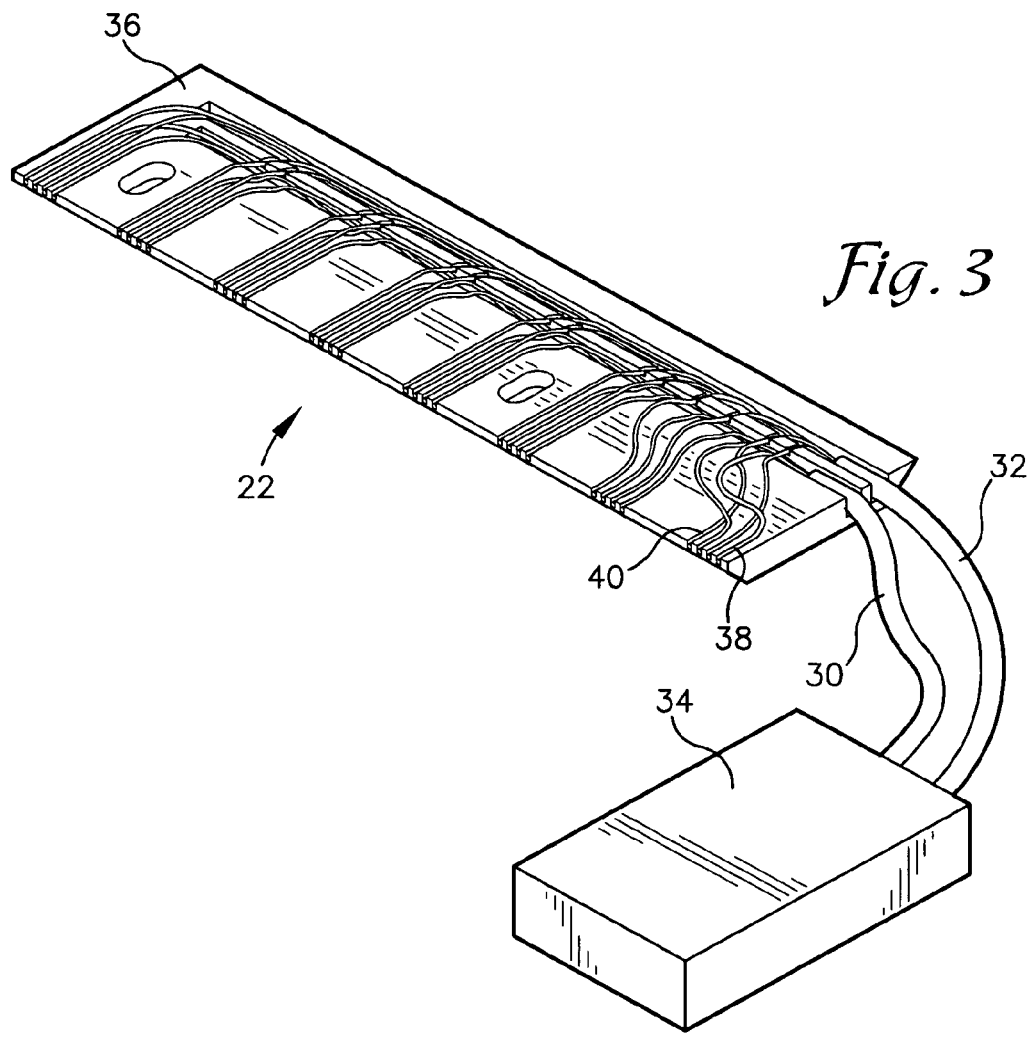
FIG. 3 is a perspective view of a bottom side of one fiber optic sensor of the system of FIG. 1, including an amplifier for sending and receiving pulses of light.

As illustrated in FIG. 3, the at least one fiber optic sensor 22 may comprise at least one send fiber optic cable 30 for sending pulses of light, at least one receive fiber optic cable 32 for receiving pulses of light, at least one amplifier 34 (for sending pulses of light to and receiving pluses of light from the fiber optic cables 30,32), and a housing 36 for fixing the fiber optic cables 30,32 in proper alignment with the feed roller 14 and/or the strips of material 12.

Figure 4:
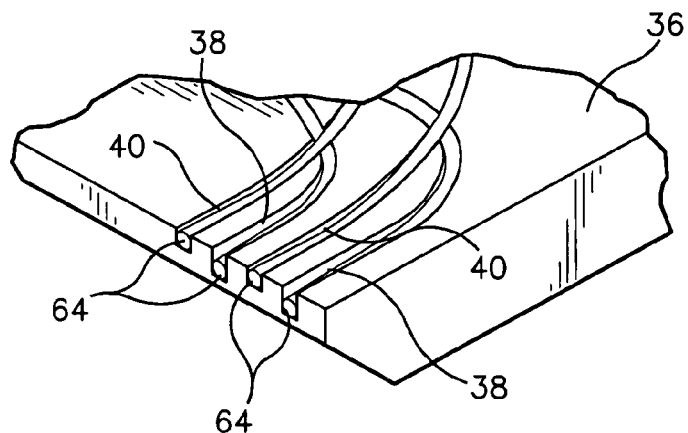
FIG. 4 is a fragmented close-up perspective view of a plurality of optical fibers of the fiber optic sensor of FIG. 3, including two send optical fibers and two receive optical fibers.

As illustrated in FIGS. 3 and 4, the send fiber optic cable 30 may comprise a plurality of send optical fibers 38 directed toward the feed roller 14, and the receive fiber optic 32 cable may comprise a plurality of receive optical fibers 40 directed toward the feed roller 14. Specifically, the fiber optic sensor 22 may comprise at least one send optical fiber 38 and least one receive optical fiber 40 per lane 24 or per strip of material 12. However, in various embodiments of the invention, there may be two send optical fibers 38 and/or two receive optical fibers 40 per lane 24 or per strip of material 12 to be monitored. The send and receive optical fibers 38,40 may be any conduit known in the art for transmitting light from one location to another. Additionally, the strips of material 12 may be positioned on the first side 18 of the feed roller along a length of the feed roller 14 at intervals corresponding to the locations of at least one of the send optical fibers 38 and at least one of the receive optical fibers 40 on the second side 20 of the feed roller 14.

Figure 6:
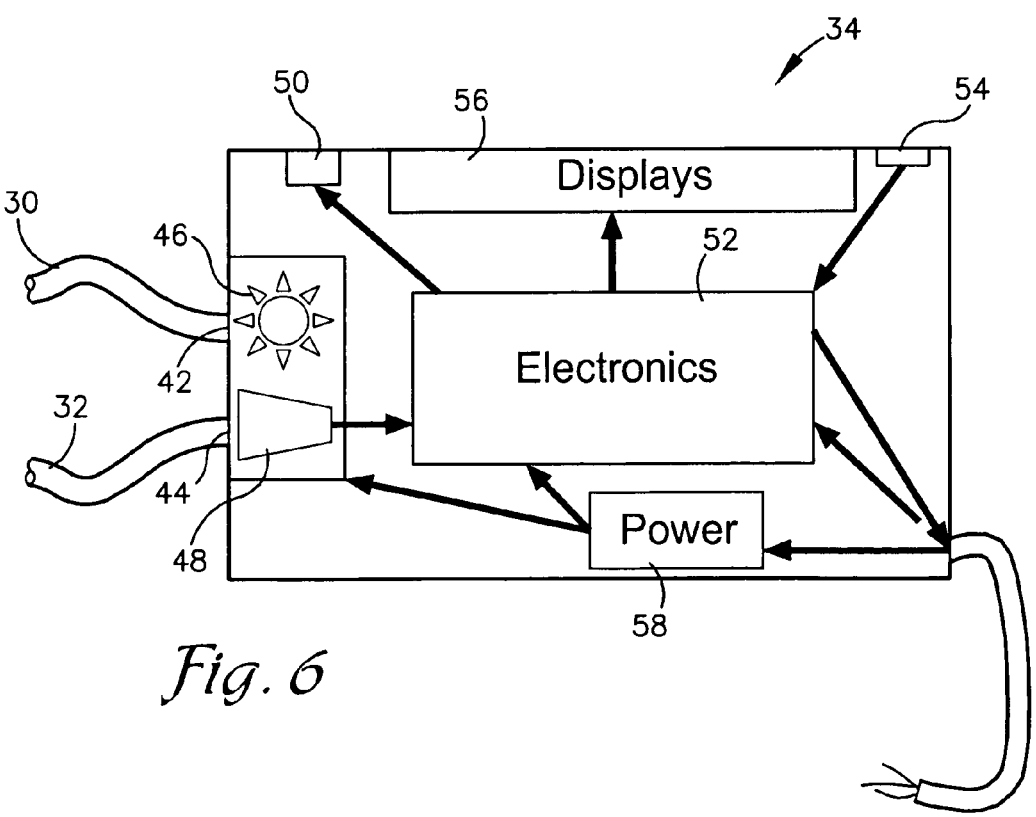
FIG. 6 is a schematic view of the amplifier of FIG. 3.

The amplifier 34 may be any apparatus for sending and receiving light over fiber optic cables. For example, as illustrated in FIG. 6, the amplifier 34 may include a light output 42, a light input 44, a light source 46, a light detector 48, an alarm 50 having a first state and a second state, and one or more electrical hardware components 52. For example, in one embodiment of the invention, the amplifier 34 may be the KEYENCE FS-V30 amplifier. The amplifier 34 may be of any size and configuration known in the art.

The light source 46 may send light out through the light output 42 of the amplifier 34 and may be any light emitter known in the art for transmitting light through fiber optic cables. For example, the light source 46 may be laser diodes, LEDs, etc. The light detector 48 may receive light through the light input 44 of the amplifier 34 and may be any light detector known in the art for turning light signals into electrical signals. For example, the light detector 48 may be a photo resistor, a photo cell, photo transistor, photo diode such as a silicon PIN photodiode, etc.

The alarm 50 may be any device known in the art that is operable to change from a first state to a second state depending on the input it receives. For example, as described herein, the electrical hardware components 52 may compare an actual amount of light received by the light detector 48 with a desired amount of light and trigger the alarm 50 if the actual amount of light received is not within a pre-determined tolerance range from the desired amount of light. For example, the predetermined range of tolerance may be T-A to T+A, where T equals a pre-determined tolerance and A equals the desired amount of light.

The alarm 50 may produce an audible, visual, or electrical signal to notify a user or a computing device that the actual amount of light detected by the light detector 48 of the amplifier 34 is not within the pre-determined tolerance range. Specifically, when the amount of light detected deviates from the desired amount of light by more than the pre-determined tolerance, the electronic hardware components 52 may send an electrical signal to the alarm 50 to change the state of the alarm 50 from a first state to a second state. For example, the first state of the alarm 50 may be a state in which the alarm 50 is off, and the second state of the alarm 50 may be a state in which the alarm 50 is on.

The electrical hardware components 52 may be any number and combination of processors, controllers, integrated circuits, programmable logic devices, or other computing devices and resident or external memory for storing data.

Specifically, the electrical hardware components 52 may be configured to receive a first electrical signal from the light detector 48 representing the actual amount of light detected and to compare the first electrical signal with a desired electrical signal representing the desired amount of light. Furthermore, the electrical hardware components 52 may be configured to send a signal commanding the alarm 50 to switch to the second state or to switch on if the first electrical signal is not representative of an amount of light within the pre-determined tolerance range.

The amplifier 34 may also comprise a user interface 54 and one or more displays 56, all of which may be communicably coupled with the electrical hardware components 52. For example, the user interface 54 may allow a user to program into memory the desired amount of light to be received by the light detector 48, as well as the pre-determined tolerance or pre-determined tolerance range. The user interface 54 may comprise one or more functionable inputs such as buttons, switches, scroll wheels, a touch screen associated with the displays, voice recognition elements such as a microphone, pointing devices such as mice, touchpads, tracking balls, styluses, a camera such as a digital or film still or video camera, combinations thereof, etc. Further, the user interface 54 may comprise wired or wireless data transfer elements such as a removable memory to enable the user and other devices or parties to remotely interface with the fiber optic sensor 22.

The displays 56 may be one or more displays coupled with the electrical hardware components 52 and may be operable to display various information corresponding to or determined by the amplifier 34, such as the actual amount of light detected, a percentage of the actual amount of light detected compared to the desired amount of light, the desired amount of light, the pre-determined tolerance range, whether or not a tow wrap is detected, etc. The displays 56 may comprise conventional black and white, monochrome, or color display elements including CRT, TFT, LCD, and/or plasma display devices. The displays 56 may be integrated with the user interface 54, such as in embodiments where the displays 56 are touch-screen displays 56 to enable a user to interact with them by touching or pointing at display areas to provide information to the amplifier 34.

The amplifier 34 may further comprise an internal or external power source 58. The power source 58 may provide electrical power to various components of the amplifier 34. For example, the power source 58 may be directly or indirectly coupled with the light source 46, the light detector 48, the electrical hardware components 52, the alarm 50, the user interface 54, and the displays 56. The power source 58 may comprise conventional power supply elements such as batteries, battery packs, etc. The power source 58 may also comprise power conduits, connectors, and receptacles operable to receive batteries, battery connectors, or power cables.

Figure 5:
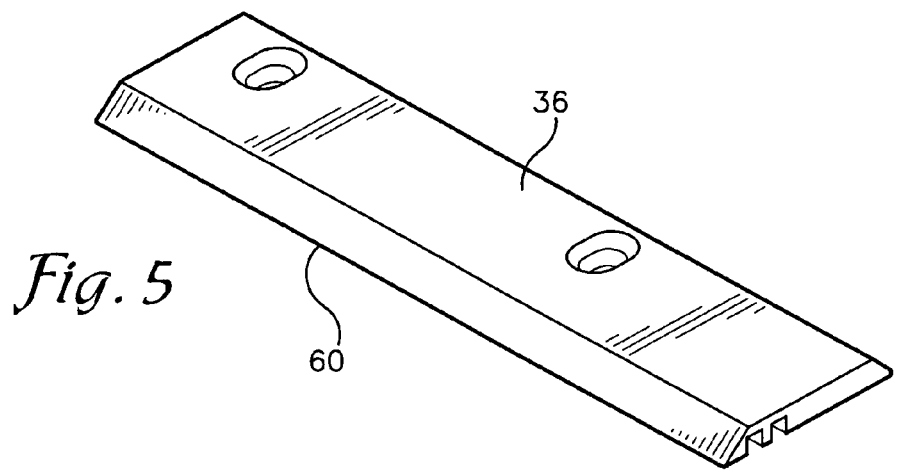
FIG. 5 is a perspective view of a top side of the fiber optic sensor of FIG. 3.
Figure 7:
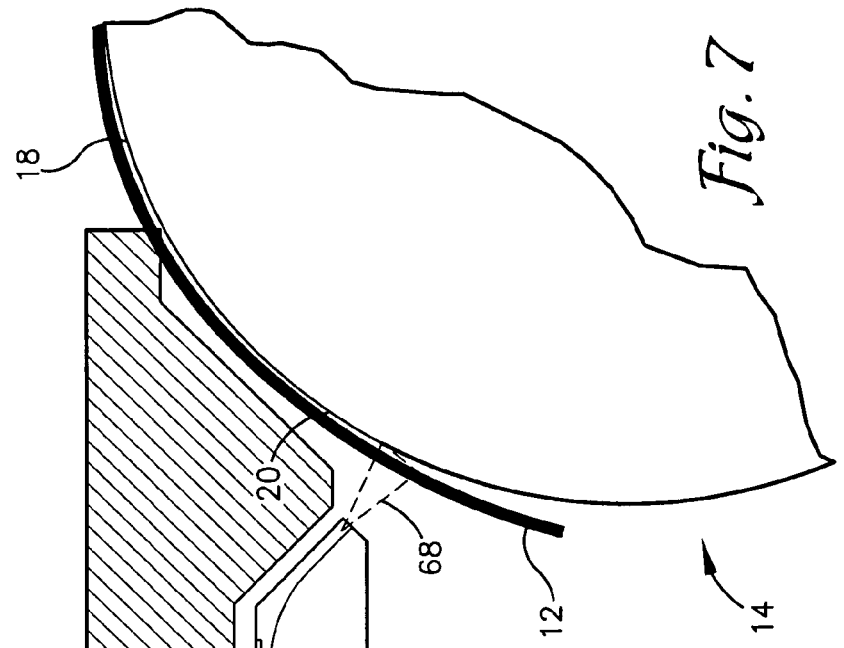
FIG. 7 is a fragmented cross-sectional elevation view of the fiber optic sensor of FIG. 3.
Figure 8:
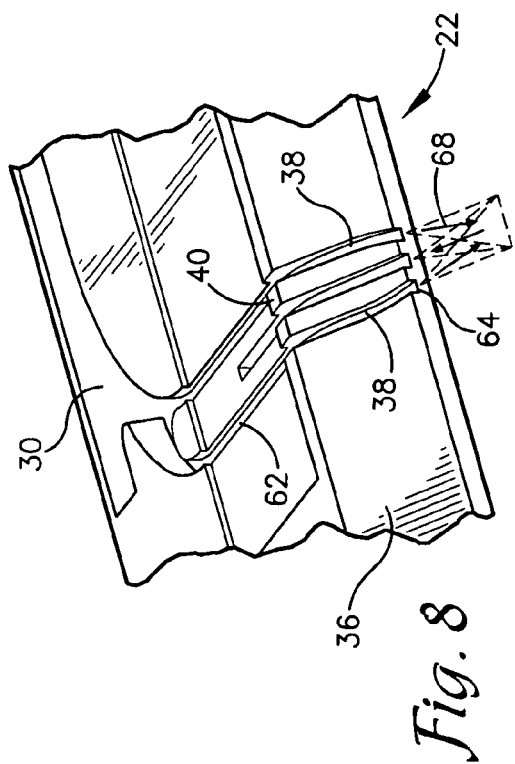
FIG. 8 is a fragmented perspective view of the fiber optic sensor of FIG. 3, illustrating two send optical fibers and one receive optical fiber.

As illustrated in FIGS. 5, 7, and 8, the housing 36 may be made of any substantially rigid material through rapid prototyping or other methods of forming solid objects of a desired shape, size, and configuration. For example, the housing 36 may have substantially tapered edges 60. The housing may comprise grooves or channels 62 machined to fix an end portion 64 of each optical fiber 38,40 in alignment with the feed roller 14.

As illustrated in FIGS. 1, 2, and 7, the housing 36 may be sized to be fitted within the forward guide plate 28, such that no additional space is needed within the composite tow placement head to house the fiber optic sensor 22. For example, the housing 36 may be sized to have a length, width, and height less than or equal to the length, width, and height of the forward guide plate 28, and may be fitted within a cavity 66 cut into the forward guide plate 28 to retrofit the forward guide plate 28 with the fiber optic sensor 22. Alternatively, the housing 36 may be made integral with the forward guide plate 28, such as during original manufacture of the composite tow placement head.

Specifically, the housing 36 may be approximately between 0.05 inches and 16 inches wide, between 0.05 and 16 inches long, and between 0.05 and 4 inches thick. Furthermore, the housing 36 may be between 3 inches and 10 inches wide, between 3 inches and 10 inches long, and between 0.1 and 1 inch thick. For example, the housing 36 may be approximately 8 inches wide, approximately 8 inches long, and approximately 0.3 inches thick.

The housing 36 may fix the end portions 64 of the send optical fibers 38 in a direction to shine light toward the outer surface 16 of the feed roller 14 at the second side 20 of the feed roller 14. The second side 20 of the feed roller 14, for example, may be forward of the first side 18 at which the strips of material 12 may contact the feed roller 14. Alternatively, the second side 20 of the feed roller 14 may be opposite of the first side 18 of the feed roller 14. Likewise, the end portions 64 of the receive optical fibers 40 may be directed to receive light reflected off of the feed roller 14 or, in the case of an occurrence of tow wrap, reflected off of one of the strips of material 12.

In various embodiments of the invention, as illustrated in FIG. 8, the housing 36 may fix two send optical fibers 38 relative to each lane 24 or strip of material 12, such that the end portions 64 of a pair of the send optical fibers 38 may direct light at slight angles. The slight angles may be such that light 68 extending from the end portions 64 of the pair of send optical fibers 38 may intersect the feed roller 14 at approximately the same point and then reflect into at least one of the receive optical fibers 40 disposed substantially between the pair of send optical fibers 38. However, in other embodiments of the invention, the light from the pair of send optical fibers 38 may form substantially parallel beams of light and at least a portion of this light may be reflected into one or more receive optical fibers 40, as depicted in FIGS. 3 and 4.

In proper, normal, or desired operation of the feed roller 14, the strips of material 12 may not pass intersect the light shining from the end portions 64 of the send optical fibers 38. Therefore, the amount of light from the send optical fibers 38 reflected off of the feed roller 14 into the receive optical fibers 40, as measured by the amplifier 34 when no tow wrap is occurring, may be the desired amount of light.

However, if one or more of the strips of material 12 begin to wrap around the feed roller 14, the light from one or more of the send optical fibers 38 may shine onto one or more of the strips of material 12, which may cause a different amount of light to be reflected and therefore received by the receive optical fibers 40. For example, the strips of material 12 may not be as reflective as the outer surface 16 of the feed roller 14. Therefore, if this occurs, the amplifier 34 may sense an amount of light that does not correspond with the desired amount of light, and may therefore alert a user or an automated system via the alarm 50. As discussed above, the amount of light may be required to deviate outside of a tolerance range before the alarm 50 may be triggered, so that slight fluctuations in the amount of light detected do not create a false alarm situation when no tow wrap has actually occurred. The operator or automated system may then take actions to correct the tow wrap error.

Figure 9:
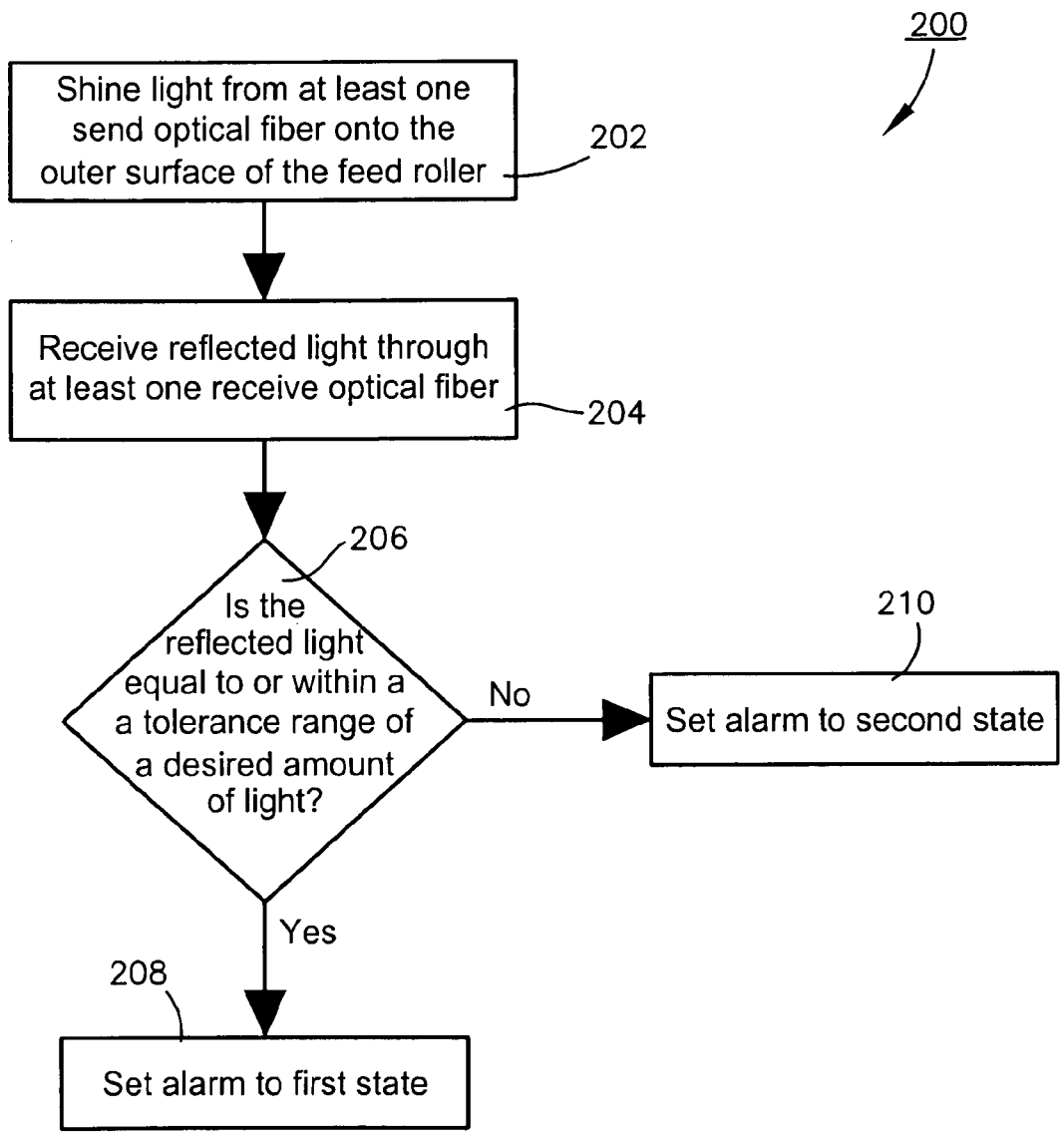
FIG. 9 is a flow chart illustrating method steps for detecting unwanted wrapping of strips of material around the feed roller of FIG. 1.

As illustrated in FIG. 9, the method 200 for using the at least one fiber optic sensor 22 to detect tow wrap may comprise shining light from at least one of the send optical fibers 38 onto the outer surface 16 of the feed roller 14 at the second side 20 of the feed roller 14 (where the strips of material 12 should not contact the feed roller 14 during proper operation) as depicted in step 202. The at least one receive optical fiber 40 may then receive reflected light, as depicted in step 204. The reflected light may be reflected off of the feed roller 14, off of one or more of the strips of material 14, or a combination thereof.

The amplifier 34 may then determine if the reflected light is equal to or within the tolerance range of the desired amount of light, as depicted in step 206. If it is within the tolerance range of the desired amount of light, the alarm 50 is set to or remains in the first state, which may be off, as depicted in step 208. If the reflected light is not within the tolerance range of the desired amount of light, the alarm 50 is set to or remains in the second state, which may be on, as depicted in step 210.

Although the invention has been described with reference to the embodiments illustrated in the attached drawings, it is noted that equivalents may be employed and substitutions made herein without departing from the scope of the invention as recited in the claims. For example, the feed roller 14, as described herein, may be one feed roller or a plurality of feed rollers which may each feed one of the strips of material 12 or more than one of the strips of material 12. Additionally, the amplifier 34 may be replaced by any alarm configured to respond according to an amount of light received. Also, while the system 10 herein has been described for use in a composite fiber tow placement machine, it is understood that such a system may be useful in other apparatuses which use rollers to feed any type of material.

Having thus described an embodiment of the invention, what is claimed as new and desired to be protected by Letters Patent includes the following:

1. A system for detecting unwanted wrapping of at least one of a plurality of strips of material around a feed roller having an outer surface contacting the strips of material as the feed roller rotates, wherein the strips of material are configured to remain to a first side of the feed roller during proper operation, the system comprising:
   at least one fiber optic sensor comprising:
      a send fiber optic cable having a plurality of send optical fibers, wherein ends of each of the send optical fibers are fixed at intervals corresponding to a spacing of the strips of material, wherein the send optical fibers are configured to send light in a direction toward the outer surface at a second side of the feed roller;
      a receive fiber optic cable having a plurality of receive optical fibers, wherein ends of each of the receive optical fibers are fixed at intervals corresponding to a spacing of the strips of material, wherein the receive optical fibers are configured to receive light from the send optical fibers reflected off of at least one of the outer surface of the feed roller and any of the strips of material; and
      an alarm configured to a first state if an amount of light received by the receive fiber optic cable is equal to or within a tolerance range from a desired amount of light and configured to a second state if the amount of light received by the receive fiber optic cable is not equal to or within a tolerance range from the desired amount of light.

2. The system of claim 1, the at least one fiber optic sensor further comprising:
   a light source for providing light to the send optical fibers; and
   a light detector for detecting light transmitted through the receive optical fiber.

3. The system of claim 1, wherein the at least one fiber optic sensor further comprises a housing configured to fix end portions of the send optical fibers toward the second side of the feed roller such that light transmitted by the send optical fibers is reflected off of the outer surface of the feed roller or the strips of material and then received by end portions of the receive optical fibers.

4. The system of claim 3, further comprising the feed roller and a guide plate of a composite fiber tow application head, wherein the housing is affixed to or integral with the guide plate and the guide plate is positioned forward of at least a portion of the feed roller.

5. The system of claim 3, wherein the housing is between 0.05 inches and 16 inches wide, between 0.05 and 16 inches long, and between 0.05 and 4 inches thick.

6. The system of claim 3, wherein the housing is between 3 inches and 10 inches wide, between 3 inches and 10 inches long, and between 0.1 and 1 inch thick.

7. The system of claim 3, wherein the desired amount of light corresponds with the amount of light received by the receive fiber optic cable when light from the send fiber optic cable is reflected off of the outer surface of the feed roller and is not reflected off of any of the strips of material.

8. The system of claim 1, wherein end portions of the send optical fibers are spaced apart from each other such that at least one send optical fiber directs light toward the feed roller at an angle such that the light is reflected off of the feed roller or the strips of material into at least one receive optical fiber.

9. The system of claim 1, wherein the strips of material have differing reflective properties than the outer surface of the feed roller.

10. A system for detecting unwanted composite fiber tow wrapping, the system comprising:
    a composite fiber tow application head configured to dispense a plurality of strips of composite fiber tow, the application head comprising:
       a guide plate, and
       a feed roller having an outer surface, a first side, and a second side, wherein the outer surface of the feed roller is positioned to contact the strips of composite fiber tow and to rotate to feed the strips of composite fiber tow over the guide plate such that the strips of composite fiber tow remain to a first side of the feed roller during proper operation;
    at least one fiber optic sensor disposed within or integral with the guide plate, the at least one fiber optic sensor comprising:
       a send fiber optic cable having a plurality of send optical fibers configured to send light in a direction toward the outer surface at the second side of the feed roller;
       a receive fiber optic cable having a plurality of receive optical fibers configured to receive light from the send optical fibers reflected off of at least one of the outer surface of the feed roller and any of the strips of composite fiber tow; and
       an alarm programmed to remain off if an amount of light received by the receive fiber optic cable is equal to or within a tolerance range from a desired amount of light and programmed to turn on if the amount of light received by the receive fiber optic cable is not equal to or within a tolerance range from the desired amount of light.

11. The system of claim 10, wherein the alarm sends one of an audible, visual, or electrical signal to a user or automated system when the amount of light received by the receive fiber optic cable is not equal to or within a tolerance range from the desired amount of light.

12. The system of claim 10, further comprising at least one amplifier comprising:
- the alarm;
- a light source for providing light to the send fiber optic cable;
- a light detector for detecting light transmitted through the receive fiber optic cable; and
- electrical hardware components configured for determining if the amount of light received by the receive fiber optic cable is equal to or within the tolerance range from the desired amount of light.

13. The system of claim 10, wherein the at least one fiber optic sensor further comprises a housing configured to fix end portions of the send optical fibers toward the second side of the feed roller such that light transmitted by the send optical fibers is reflected off of the outer surface of the feed roller or the composite fiber tow and then received by end portions of the receive optical fibers.

14. The system of claim 10, wherein end portions of the send optical fibers are spaced apart from each other such that each send optical fiber directs light toward the feed roller at an angle such that the light is reflected off of the feed roller or one of the strips of the composite fiber tow into at least one receive optical fiber.

15. The system of claim 10, wherein the composite fiber tow has differing reflective properties than the outer surface of the feed roller.

16. The system of claim 10, wherein the plurality of send optical fibers and the plurality of receive optical fibers each have end portions fixed proximate a second side of the feed roller at intervals corresponding with a spacing of the strips of composite material positioned on the first side of the feed roller along a length of the feed roller.

17. A method for detecting unwanted wrapping of a plurality of strips of material around a feed roller, the method comprising:
- positioning the strips of material within a composite fiber tow application head such that the strips of material contact a circumferential outer surface of the feed roller at a first side of the feed roller during proper operation of the application head;
- sending light through a plurality of send optical fibers of a single send fiber optic cable to the outer surface of the feed roller on a second side of the feed roller, wherein a physical spacing apart of end portions of each of the send optical fibers corresponds with a physical spacing apart of the strips of material along the feed roller;
- receiving the light from the plurality of send optical fibers reflected off of at least one of the outer surface of the feed roller and any of the strips of material and transmitted through one or more receive optical fibers of a single receive fiber optic cable;
- setting an alarm to a first state if the light received is equal to or within a tolerance range of a desired amount of light; and
- setting the alarm to a second state if the light received is equal to or within the tolerance range of the desired amount of light.

* * * * *